United States Patent

Botros

[11] 4,051,119
[45] Sept. 27, 1977

[54] AZOMETHINE DYES DERIVED FROM AN O-HYDROXY AROMATIC ALDEHYDE AND A 2-AMINOPYRIDINE

[75] Inventor: Raouf Botros, Beech Creek, Pa.

[73] Assignee: American Color & Chemical Corporation, Charlotte, N.C.

[21] Appl. No.: 609,683

[22] Filed: Sept. 2, 1975

[51] Int. Cl.² .................. C09B 29/14; C09B 29/36; D06P 1/02; D06P 3/79
[52] U.S. Cl. ................................ 260/156; 260/196; 260/206; 260/296 R; 260/296 N
[58] Field of Search .................................... 260/156

[56] References Cited

U.S. PATENT DOCUMENTS

| | | | |
|---|---|---|---|
| 3,192,195 | 6/1965 | Coe | 260/156 |
| 3,468,892 | 9/1969 | Tomcufcik et al. | 260/293 |
| 3,501,453 | 3/1970 | Steinemann | 260/156 |
| 3,552,906 | 1/1971 | Ramanathan et al. | 260/156 |
| 3,681,319 | 8/1972 | Lindberg | 260/156 |

Primary Examiner—Floyd D. Higel

Attorney, Agent, or Firm—Armstrong, Nikaido & Marmelstein

[57] ABSTRACT

Azomethine dyes of the formula

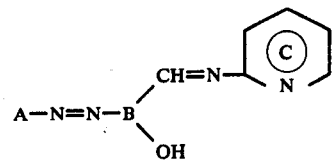

in which A is phenyl, naphthyl, phenyl substituted by up to 3 substituents or naphthyl substituted by up to 2 substituents; B is salicylaldehyde, o-hydroxy-naphthaldehyde or salicylaldehyde or o-hydroxy-naphthaldehyde substituted by up to 2 substituents and C is 2-aminopyridyl or 2-aminopyridyl substituted by up to 2 substituents. The dyes produce dyeings on metal-modified polypropylene of excellent fastness properties.

7 Claims, No Drawings

AZOMETHINE DYES DERIVED FROM AN O-HYDROXY AROMATIC ALDEHYDE AND A 2-AMINOPYRIDINE

BACKGROUND OF THE INVENTION

1. Field of the Invention

The present invention relates to azo dyes useful in the dyeing of polyolefins and, in particular, to azo dyes having an azo methine linkage and which have utility in the dyeing of metal-modified, or metal-containing, polypropylene textile materials.

2. Description of the Prior Art

Polypropylene, because of its excellent mechanical strength, high elasticity and resistance to solvents, has found increased utility in recent years as filaments, yarns, fabrics, ropes and the like. To provide stability against degradation due to light and to provide reactive sites for dyes, the polypropylene generally contains metal or metal salts or chelates.

Chelatable dyes having specific utility in the dyeing of such metal-containing, or metal-modified, polypropylene are reported extensively in the literature.

Thus, for example, Siegrist et al., U.S. Pat. No. 3,399,027, discloses a process for dyeing polyolefins containing organic nickel chelate complexes with an aqueous dispersion of an azomethine dye. As the azomethine dyes there are disclosed dyes of the formulas:

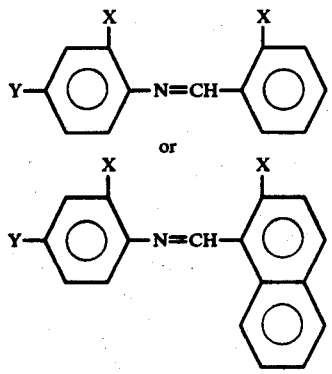

where
X is OH or COOH, and
Y is phenylazo or naphthylazo and may be para to X.

Wolfrum, U.S. Pat. No. 3,630,656, discloses a process for the dyeing and printing of metal-containing propylene with compounds of the general formula

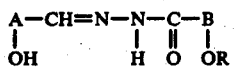

where A and B are optionally substituted benzene or naphthalene radicals and R is alkyl. It is disclosed that the substituent —CH=N— and the —OH group are attached to adjacent carbon atoms and that the substituent —OR and the substituent

are also attached to adjacent carbon atoms. A and B cannot simultaneously represent radicals of the benzene series.

Other common chelatable dyes are those containing as the chelating groups, o,o'-dihydroxyazo; o-hydroxy-o'-carboxyazo; o-hydroxy-o'-aminoazo and o-carboxy-o'-aminoazo groups. Although dyes of this type having complexing groups adjacent to the chromophoric portion bind strongly to the metal of metal-modified polypropylene, thus giving it excellent fastness to rubbing, washing and drycleaning, they usually produce dull colors. Additionally there is a drastic change in hue between the chelated and unchelated dye which can cause unevenness on the metallized fiber depending on the concentration of metal in the fiber. This difference in hue can adversely affect the application of these chelatable dyes to the pile of a metal-modified propylene carpet having a non-chelatable backing.

SUMMARY OF THE INVENTION

According to the present invention chelatable azo dyes having an azo-methine linkage are provided which show very little change in hue between the chelated and unchelated dye and which dye metal-modified polypropylene with outstanding fastness to light, rubbing, washing and drycleaning.

The dyes according to the invention may be represented by the general structure (I):

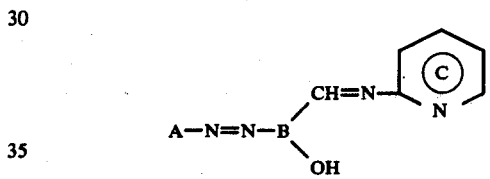

wherein
A is a benzene or naphthalene nucleus which is unsubstituted or substituted with: lower alkyl of 1–4 carbons; lower alkoxy of 1–4 carbons; nitro; cyano; halogen; trifluoromethyl; hydroxyl; acyloxy; carboxyl; carbalkoxyl of 1–4 carbons in the alkyl moiety; acyl of 1–4 carbons in the alkyl moiety; benzoyl; acylamide, the acyl containing 1–4 carbons; benzamido; or carbamyl, the nitrogen being unsubstituted or singly or doubly substituted with lower alkyl of 1–4 carbons;

B is a salicyclaldehyde or an o-hydroxy-naphthaldehyde nucleus which is unsubstituted or substituted with lower alkyl of 1–4 carbons; lower alkoxyl of 1–4 carbons; halogen or cyano; and C is a 2-aminopyridine nucleus which is unsubstituted or substituted with lower alkyl of 1–4 carbons; lower alkoxyl of 1–4 carbons; nitro or halogen.

According to another embodiment of the invention there is provided metal-modified polyolefin textile material dyed with a dye of the general formula (I). The dyed polyolefin textile material has outstanding fastness properties.

DETAILED DESCRIPTION

According to the present invention there are provided dyes of the general formula (I)

-continued

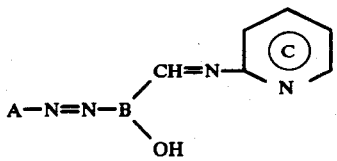

wherein
- A is a benzene or a naphthalene nucleus, the benzene nucleus being unsubstituted or substituted with up to 3 substituents and the naphthalene nucleus being unsubstituted or substituted with up to 2 substituents, the substituents being independently selected from lower alkyl of 1-4 carbons; lower alkoxyl or 1-4 carbons; nitro; cyano; fluorine; chlorine; bromine; trifluoromethyl; hydroxyl; acyloxy (RCOO—, where R is alkyl of 1-4 carbons); carboxyl; carbalkoxyl (ROCC—, where R is alkyl of 1-4 carbons); acyl (RCO—, where R is alkyl of 1-4 carbons); benzoyl; acylamide (RCONH—, where R is alkyl of 1-4 carbons); benzamido (ArCONH—, where Ar is phenyl) or carbamyl, the nitrogen of which is substituted or singly or doubly substituted with lower alkyl of 1-4 carbons;
- B is a salicyclaldehyde or an o-hydroxy-naphthaldehyde nucleus which is unsubstituted or substituted with up to 2 substituents independently selected from lower alkyl of 1-4 carbons; lower alkoxyl of 1-4 carbons; cyano; fluorine; chlorine or bromine;
- C is a 2-aminopyridine nucleus which is unsubstituted or substituted with up to 2 substituents independently selected from lower alkyl of 1-4 carbons; lower alkoxyl of 1-4 carbons; nitro; chlorine or bromine.

The dyes are obtained by condensing salicylaldehyde or an o-hydroxy-naphthaldehyde, or their substututed derivatives, with a 2-aminopyridine in an organic solvent to form a coupler of the formula (II)

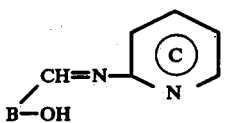

(II)

wherein B and C are as defined above. An aromatic amine of the formula A—NH$_2$, where A is as defined above, is diazotized and coupled into the coupler (II). Alternatively, the dyes may be prepared by diazotizing the aromatic amine and coupling into the salicylaldehyde or the o-hydroxynaphthaldehyde and thereafter condensing the resultant azo compound with the 2-aminopyridine. (It is to be noted that reference hereinafter to the aromatic amine, salicyclaldehyde o-hydroxy-naphthaldehyde and 2-aminopyridine unless otherwise specified includes the unsubstituted and substituted compounds as defined above.)

As the salicylaldehydes and o-hydroxy-naphthaldehydes suitable for preparing the azomethine dyes according to the present invention there may be used any of the compounds coming within the definition of the member B of the general formula (I). Substitution within the salicylaldehyde or the o-hydroxy-naphthaldehyde nucleus is believed to be limited only by the availability of a suitable site in the nucleus for coupling into the diazotized amine. It is of course understood that in the o-hydroxy-naphthaldehydes, the hydroxy group is required to be ortho to the —CHO group. The choice of salicyclaldehydes or o-hydroxy-naphthaldehydes will generally be limited only by economic and toxicological considerations with the commercially available species being preferred.

Suitable 2-aminopyridines include, for example, 2-aminopyridine, 2-amino-4-picoline; 2-amino-4-chloropyridine; 2-amino-3-bromo-5-nitropyridine and 2-amino-5-chloropyridine. Choice of the 2-aminopyridines is limited only by practical considerations.

As suitable diazotizable aromatic amines, there may be mentioned anilinecarboxylic acids, such as anthranilic acid, 5-chloro-2-aminobenzene-1-carboxylic acid, and 5-nitro-2-aminobenzene-1-carboxylic acid; hydroxy substituted amines such as 1-amino-2-hydroxybenzene, 2-hydroxy-4 or 5-nitroaniline and 2-hydroxy-5-chloroaniline; 4-nitroaniline; orthoanisidine; 3-chloro-o-toluidine, 4-nitro-3-chloro-o-toluidine; p-ethylaniline, p-butylaniline; 2-chloro-5-trifluoromethylaniline; 4-nitro-2-chloroaniline; 2,6-dichloroaniline, and 2,4-dimethoxyaniline; 1-naphthylamine; 1-amino-2-naphthol and 6-amino-2-naphthol-3-carboxylic acid. Other aromatic amines, of course, may be employed as a starting material to prepare the azo dyes according to the invention and are believed to be limited only by economic considerations and commercial availability.

The starting materials employed in the working examples that follow result in dyes that provide dyeings on metal-containing polypropylene, and particularly Ni-containing polypropylene, having good fastness properties. Best results appear to be obtained with dyes prepared from aromatic amines, A-NH$_2$, substituted by alkyl, alkoxyl, halogen or trifluoromethyl substituents as defined above; salicyclaldehydes or o-hydroxy-naphthaldehydes substituted by alkyl, alkoxyl or halogen and 2-aminopyridine substituted with alkyl, alkoxyl or halogen.

The condensation of the 2-aminopyridine with the salicylaldehyde or with the aromatic azo - salicylaldehyde derivative is carried out under conditions typical in the condensation reaction of aromatic amines and aldehydes. Thus, for example, the condensation may be carried out by refluxing the reactants in an organic solvent.

Diazotization of the aromatic amine and coupling of the diazotized amine into the salicylaldehyde, o-hydroxy-naphthaldehyde or the coupler (II) are carried out in the usual way. Diazotization of the aromatic amine is effected by heating it in an aqueous solution of strong mineral acid such as hydrochloric acid, cooling the resulting solution to a temperature of 0°-10° C., and adding thereto a quantity of sodium nitrite slightly in excess of the stoichiometric requirement. An alternate method of diazotization involves dissolving sodium nitrite in concentrated sulfuric acid, heating to a temperature of about 60°-70° C., cooling the resulting solution to 0°-10° C. and adding thereto the aromatic amine.

The coupling reaction is carried out by adding the diazonium salt to a cold aqueous alkaline solution of the respective coupler. The mixture is allowed to react for 8-24 hours at room temperature and is thereafter filtered and washed with 10% sodium chloride solution. The product is then reslurried in water and made acidic to Congo Red paper with hydrochloric acid. The mixture is filtered and the cake is washed neutral with water. The desired azo product is thus obtained in the form of a wet cake.

The azo-methine dyes (I) of the present invention have outstanding utility in the dyeing of metal-containing polyolefins and especially, nickel-containing polypropylene fiber materials. The dyed metal-modified polypropylene fiber materials according to the present invention include as the starting polypropylene fiber material any of the conventionally produced polypropylene materials which contain a metal such as aluminum, nickel, zinc and the like either as such or in the form of its salts or chelates. The exact metal content of these fibers is not known but is believed to vary within the range of about 0.1 to about 2.0 weight percent. The metal improves the dyeing of the fiber materials and also serves to stabilize the materials against degradation due to light and heat. Nickel-containing polypropylene materials dyes with the structure of formula (I) have been shown to have excellent fastness properties. Such nickel-containing polypropylene materials are available commercially, for example, under the trademark Herculon.

To prepare the dye for application to the metal-modified fiber substrates, it must be suitably dispersed. This may be done by any of several well-known methods, e.g. milling as in a ball-mill with dispersing agents such as lignin sulfonic acid materials. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and wetting agents may be added as desired.

Dispersed pastes are made by wet milling the dye in conventional equipment in the presence of a dispersing agent, preferably sodium lignin sulfonate or sodium alkyl-naphthalene sulfonate. Various other commercially available dispersing agents, such as sodium salts of carboxylated polyelectrolytes and the naphthalene sulfonates, e.g. the condensation products of sulfonated naphthalene and formaldehyde, such as sodium, dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball-mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 10–50 percent by weight color content (pure color).

The disperse dyes may be applied to the metal-containing polypropylene fibers or fabrics in a manner conventional in the dyeing of disperse dyestuffs and may be applied, for example, as neutral, acidic, or alkaline aqueous suspensions, with the use of dispersing agents, from a dyebath, preferably at temperatures of from 50° C to 105° C. When temperatures of less than about 100° C. are employed, it is generally advantageous to add a customary carrier substance. These dyes can also be applied to the metal-containing polypropylene fabrics by a printing process. The printing paste can be thickened with customary thickening agents and may also contain other additives conventionally used with printing pastes. The printing paste is expediently applied to the fabric by a printing block or a roller, whereupon the printed fabric is dried and steamed at a temperature between 105° C and 110° C. After the dyeing or printing of the polypropylene material, it is treated with a hot aqueous soap solution. As suitable dyeing and printing techniques there may be mentioned those described in U.S. Pat. Nos. 3,399,027; 3,399,952; 3,492,078; 3,556,709 and 3,360,656.

Ni-containing polypropylene carpet printed with a dye of formula (I) where the diazo component is 4-nitroaniline, shows excellent fastness properties. The fabric is colored a deep yellowish orange of desirable brightness, especially under artificial light. Besides a very good fastness to light, washing and rubbing, the excellent fastness to dry cleaning is particularly noteworthy.

The invention may be better understood by referring to the following examples.

EXAMPLE I

A. Preparation of the Azo-Compound

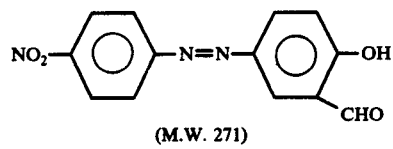

(M.W. 271)

A mixture of 27.6 g. p-nitroaniline in 80 g. hydrochloric acid, 32% and 80 ml. water was heated at 70° C to complete solution. The clear solution was drowned into an ice-water mixture, and was diazotized below 5° C with 14 g. sodium nitrite dissolved in 50 ml. water. The clear diazo solution was added during 30 minutes at 0° C to a solution of 24.4 g. salicylaldehyde in 750 ml. water which contained 8 g. sodium hydroxide flakes and 74 g. sodium carbonate. The coupling mixture was stirred to room temperature overnight. It was thereafter filtered, and the cake was washed with 10% sodium chloride solution. The product was then reslurried in water and was made acidic to Congo Red paper with hydrochloric acid. The mass was filtered and the cake was washed neutral with water. The product was dried in an oven at 80° C.

Yield: 51 g.; Theory: 54.2 g.

B. Condensation to form the Dye

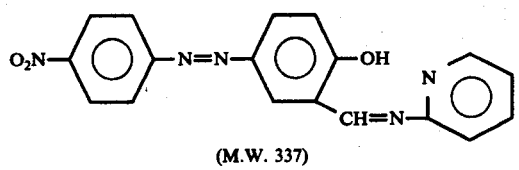

(M.W. 337)

A mixture of 20.3 g. of the product obtained in (A) and 7.5 g. 2-aminopyridine was refluxed in 100 g. denatured alcohol until the starting material could no longer be detected by TLC. This required about four hours. The reaction mixture was stirred to room temperature and was filtered. The filter cake was washed with 100 g. denatured alcohol and was dried in an oven.

Yield: 21.9 g; Theory: 25.3 g.

20 g. of the product of (B) was charged to a sandmill with 30 g. of Lignosol FTA and 150 ml. water. The mixture was sandmilled until dispersion test was satisfactory.

Yield: 200 g. 10% color content paste.

C. Dyeing of a Ni-containing polypropylene from a dyebath

Piece goods of "Herculon Type 40" an isotactic polypropylene containing a bis(p-alkylphenol)monosulfide nickel compound in the amount of about 0.12% calculated as metallic nickel by weight based on the weight of the polypropylene, were placed in a bath set at 35° C containing 1% Triton X-100 (iso-octyl-phenyl-polyethoxyethanol) based on weight of fiber, 1.0–1.5% acetic acid (pH 3–4) and a 1.0% (based on weight of fiber) dispersion of the dye from (B). After 5 minutes the temperature was raised to 95° C over a 30 minute period. The dyeing was continued at 95° for an additional 45 minutes. The piece goods were removed from the dye bath, rinsed and soaped in 0.5% soap solution at 90° C for 10 minutes. The dyed fabrics were rinsed with water and dried. They were colored a deep brilliant golden orange shade of outstanding light fastness and excellent fastness to crocking and dry cleaning.

The evaluation of the fastness of dyeings was conducted in accordance with the following AATCC methods:

Colorfastness to dry cleaning (AATCC Test Method 132-1973), p. 117 of the 1974 Technical Manual of the AATCC.

Colorfastness to crocking (AATCC Test Method 8-1972), p. 112 of the 1974 Technical Manual of the AATCC.

Colorfastness to light, Xenon-Arc Lamp (AATCC Test Method 16E-1974), p. 133 of the 1974 Technical Manual of the AATCC.

D. Dyeing of a Ni-containing polypropylene with a printing paste

A printing paste was prepared with 1000 parts of Tragacanth gum thickener (polysaccharides of galactose, fructose, xylose and arabinose with glucuronic acid), 5 parts acetic acid and a quantity of dispersed dye corresponding to 5 to 10 parts of a pure dye obtained in (B). A fabric made of fibers of polypropylene containing nickel (Herculon Type 40) was printed on a roller. The fabric was dried and steamed for 8 minutes at 105°–110° C. The fabric was vigorously washed in a bath of soap at 90° C. A brilliant golden orange shade was obtained which possessed outstanding fastness to light and crocking and excellent fastness to the chlorinated solvents used in dry cleaning.

EXAMPLE II

A. Condensation product of 2-Aminopyridine with Salicylaldehyde

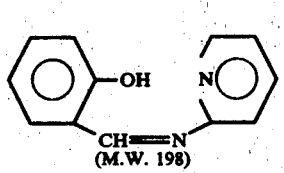

(M.W. 198)

A mixture of 61 g. salicylaldehyde and 50 g. 2-aminopyridine was refluxed in 50 g. denatured alcohol for 4 hours. The reaction mass was then cooled to 10° C and was filtered at this temperature. The product was washed with several portions of cold water and was dried in an oven at 50° C.

The product was obtained in 53.7% yield.

p-Nitroaniline diazo coupled with this product produced prints on Ni-containing polypropylene similar to those obtained in Example I(D) except that the shade was a little duller.

EXAMPLE III

A. Preparation of the Azo Compound

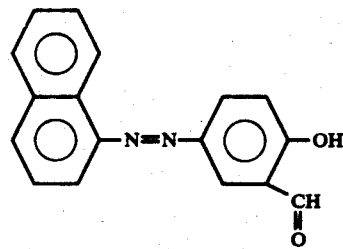

(M.W. 276)

A mixture of 64.4 g. 1-naphthylamine in 160 g. 32% hydrochloric acid and 800 ml. water was heated to a complete solution. The clear solution was iced to 0° C. and was diazotized with a solution of 31.5 g. sodium nitrite in 250 ml. water. After stirring 30 minutes at 0° C., excess nitrous acid was destroyed with sulfamic acid and the diazo solution was clarified. The clear diazo solution was added during one hour at 0° C to a solution of 54.9 g. salicylaldehyde in 3000 ml. water, 18 g. sodium hydroxide flakes and 160 g. sodium carbonate. After coupling was complete, the mixture was filtered and the cake was reslurried without washing, into 2000 ml. water and was made acidic to Congo Red paper with hydrochloric acid. The mass was filtered and the cake was washed neutral with water.

Yield: 115.5 g.; Theory: 124.2 g.

B. Preparation of the Dye

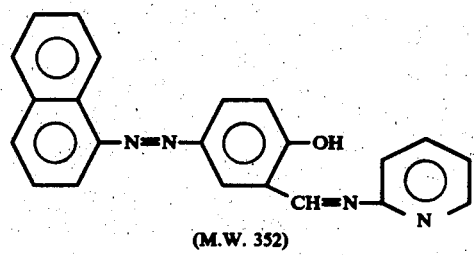

(M.W. 352)

A mixture of 27.6 g. of the product obtained in (A) and 9.4 g. 2-aminopyridine was heated in 150 g. dimethylformamide at 80°–85° C until the starting material was no longer present as shown by TLC. The reaction mixture was drowned into 4000 ml. cold water. The product separated was filtered and washed with water.

Yield: 30.5 g; Theory: 35.2 g.

The dispersed product, when printed on Ni-containing polypropylene, produced attractive orange shades of excellent light fastness and good resistance to crocking and dry cleaning solvents.

EXAMPLE IV

A. Preparation of the Azo Compound

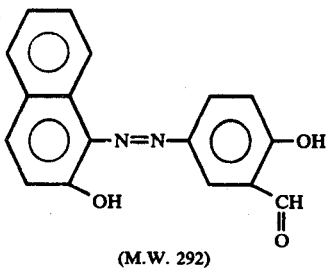

(M.W. 292)

A mixture of 79 g. 1-amino-2-naphthol in 160 g. 32% hydrochloric acid and 800 ml. water was stirred and iced to 5° C. Then there was added in sequence 1 g. copper sulfate and a solution of 35 g. sodium nitrite dissolved in 150 ml. water. After stirring for one hour, excess nitrous acid was destroyed with sulfamic acid. The diazo mixture was then added during one hour to a solution of 61 g. salicylaldehyde in 3000 ml. water, 20 g. sodium hydroxide flakes and 160 g. soda ash. After coupling was complete the mixture was filtered and the cake was reslurried without washing, into 2000 ml. water and was made acidic to Congo Red paper with hydrochloric acid. The mass was filtered and the cake was washed neutral with water.

Yield: 120 g. Theory: 146 g.

B. Preparation of the Dye

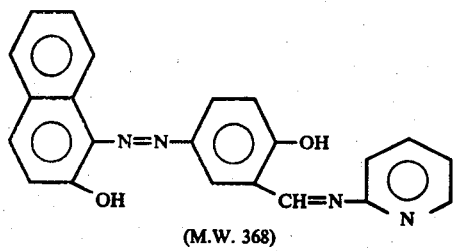

(M.W. 368)

A mixture of 29.2 g. of the product obtained in (A) and 9.4 g. 2-aminopyridine was heated in 150 g. dimethylformamide at 80°-95° C until the starting material was no longer present as shown by TLC. The reaction mixture was drowned into 4000 ml. cold water. The product separated was filtered and washed with water.

Yield: 29 g. Theory: 36.8 g.

The dispersed product, when printed on Ni-containing polypropylene produced strong brown shades of excellent light fastness and very good resistance to crocking and dry cleaning solvents.

EXAMPLE V

A. Preparation of the Azo Compound

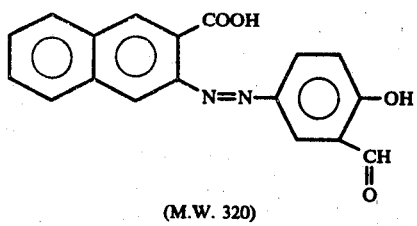

(M.W. 320)

A mixture of 83.7 g. 3-amino-2-naphthoic acid in 160 g. 32% hydrochloric acid and 800 ml. water was heated to a solution. It was then iced to 0° C and was diazotized with a solution of 31.5 g. sodium nitrite in 200 ml. water. After stirring 30 minutes at 0° C, excess nitrous acid was destroyed with sulfamic acid. The diazo solution was added during one hour at 0° C to a solution of 54.9 g. salicylaldehyde in 3000 ml. water, 18 g. sodium hydroxide flakes and 160 g. sodium carbonate. After coupling was complete, the mixture was filtered and the cake was reslurried, without washing, into 2000 ml. water and was made acidic to Congo Red paper with hydrochloric acid. The mass was filtered and the cake was washed neutral with water.

Yield: 123 g.; Theory 144 g.

B. Preparation of the Dye

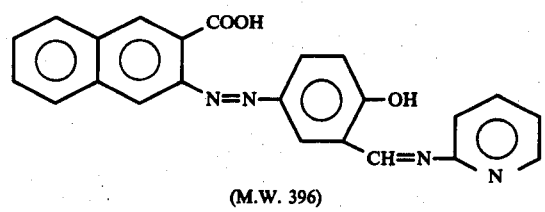

(M.W. 396)

A mixture of 32 g. of the product obtained in (A) and 9.4 g. 2-aminopyridine was heated in 150 g. dimethylformamide at 80°-85° C until the starting material was no longer present as shown by TLC. The reacton mixture was drowned into 4000 ml. cold water. The product separated was filtered and washed with water.

Yield: 33.5 g.; Theory: 39.6 g.

The dispersed product dyed Ni-containing polypropylene in strong yellowish brown shades of excellent light fastness and outstanding resistance to crocking and dry cleaning solvents.

EXAMPLE VI

A. Preparation of the Azo Compound

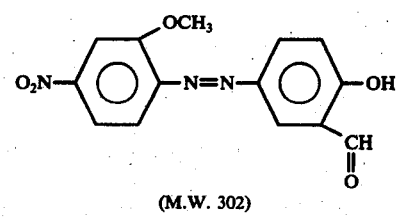

(M.W. 302)

A mixture of 50.4 g. 4-nitro-o-anisidine in 120 g. 32% hydrochloric acid, 3 g. Tween 20 and 120 ml. water was heated at 60° C for one hour. The hot slurry was drowned into a mixture of 1000 ml. water, 500 g. ice and 3 g. Tween 20. It was then diazotized at 0°-5° C with a solution of 21 g. sodium nitrite in 300 ml. water. After stirring one hour at 0° C, excess nitrous acid was destroyed with sulfamic acid and the diazo solution was clarified. The clear solution was added during one hour at 0° C to a solution of 36.6 g. salicylaldehyde in 1000 ml. water, 112.4 g. soda ash and 12 g. sodium hydroxide beads. After coupling was complete, the mixture was filtered and the cake was reslurried, without washing, into 2000 ml. water and was made acidic to Congo Red paper with hydrochloric acid. The mass was filtered and the cake was washed neutral with water.

Yield: 73.9 g.; Theory: 90.6 g.

B. Preparation of the Dye

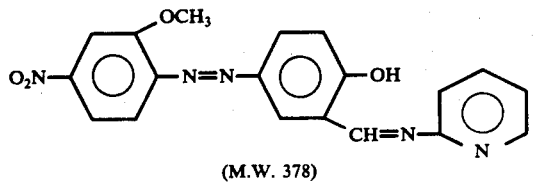

(M.W. 378)

A mixture of 30.2 g. of the product obtained in (A) and 9.4 g. 2-aminopyridine was heated in 150 g. dimethylformamide at 80°–85° C until the starting material was no longer present as shown by TLC. The reaction mixture was drowned into 4000 ml. cold water. The product separated was filtered and washed with water.

Yield: 32.5 g.; Theory: 37.8 g.

The dispersed product dyes Ni-containing polypropylene in brilliant golden orange shades of adequate light fastness and outstanding resistance to crocking and dry cleaning solvents.

EXAMPLE VII

A. Preparation of the Azo Compound

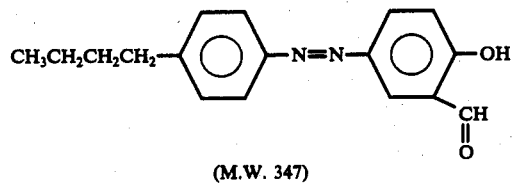

(M.W. 347)

A mixture of 44.7 g. p-n-butylaniline in 90 g. 32% hydrochloric acid, 900 ml. water and 3 g. Tween 20 was stirred at room temperature to complete solution. The clear solution was iced to 0° C and was diazotized at 0° C with a solution of 21 g. sodium nitrite in 300 ml. water. After stirring one half hour at 0° C, excess nitrous acid was destroyed with sulfamic acid. Th clear diazo solution was added during one hour at 0° C to a solution of 36.6 g. salicylaldehyde in 1000 ml. water, 12 g. sodium hydroxide beads and 86 g. soda ash. After coupling was complete, the mixture was filtered and the cake was reslurried without washing into 2000 ml. water and was made acidic to Congo Red paper with 32% hydrochloric acid. The mass was filtered and the cake was washed neutral with water.

Yield: 65 g.; Theory: 104 g.

B. Preparation of the Dye

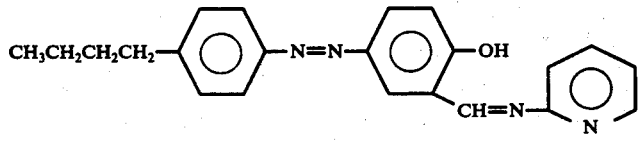

(M.W. 423)

A mixture of 34.7 g. of the product obtained in (A) and 9.4 g. 2-aminopyridine was heated in 150 g. dimethylformamide at 80°–85° C until the starting material was no longer present as shown by TLC. The reaction mixture was drowned into 4000 ml. cold water. The product separated was filtered and washed with water.

Yield: 37.5 g.; Theory: 42.3 g.

The dispersed product dyed Ni-containing polypropylene in brilliant golden orange shades of excellent light fastness and outstanding resistance to crocking and dry cleaning solvents.

EXAMPLE VIII

A. Preparation of the Dye

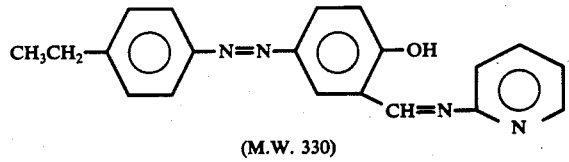

(M.W. 330)

A mixture of 12.1 g. p-ethylaniline in 30 g. 32% hydrochloric acid, 1 g. Tween 20 and 300 ml. water was diazotized at 0° C with a solution of 7.1 g. sodium nitrite dissolved in 50 ml. water. After stirring one half hour at 0° C, excess nitrous acid was destroyed with sulfamic acid. The clear diazo solution was added during one hour at 0° C to a solution of 19.8 g. N-2-(o-hydroxybenzylidene)pyridine(obtained in Example II(A)) in 1000 ml. water, 4 g. sodium hydroxide beads and 28 g. soda ash. After coupling was complete, enough sodium chloride was added to make 20% salt solution. The mixture was filtered and the cake was reslurried, without washing, into 1000 ml. water. The mixture was made acidic to Congo Red paper with 32% hydrochloric acid. It was then filtered and the cake was washed neutral with water.

Yield: 20.3 g.; Theory: 33 g.

The dispersed product, when applied to Ni-containing polypropylene fibers, produced prints of brilliant golden yellow shades having outstanding light fastness and excellent resistance to crocking and dry cleaning solvents.

EXAMPLE IX

A. Preparation of the Dye

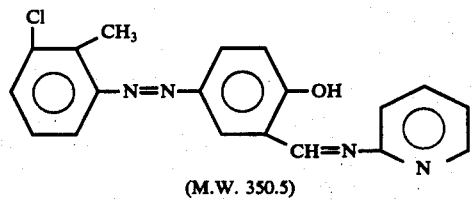

(M.W. 350.5)

A mixture of 14.1 g. 3-chloro-2-methylaniline in 40 g. 32% hydrochloric acid, 1 g. Tween 20 and 500 ml. water was diazotized at 0° C with a solution of 7.1 g. sodium nitrite in 100 ml. water. After stirring 15 minutes at 0° C, excess nitrous acid was destroyed with sulfamic acid. The clear diazo solution was added during one hour at 0° C. to a solution of 19.8 g. N-2-(o-hydroxybenzylidene)pyridine (obtained in Example II(A)) in 500 ml. water, 4 g. sodium hydroxide beads and 37 g. soda ash. After coupling was complete, the mixture was filtered and the cake was washed neutral with water.

The dispersed product dyed nickel containing polypropylene in strong reddish orange shades having outstanding resistance to crocking and excellent light fastness.

EXAMPLE X

A. Preparation of the Dye

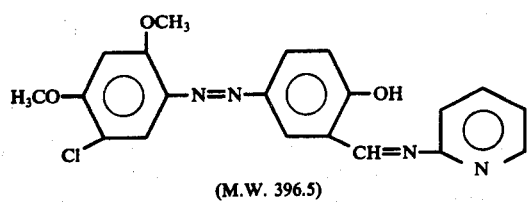

(M.W. 396.5)

A mixture of 18.8 g. 5-chloro-2,4-dimethoxyaniline in 40 g. 32% hydrochloric acid and 200 ml. water was diazotized at 0°–5° C with a solution of 7.2 g. sodium nitrite in 50 ml. water. After stirring one hour below 5° C, excess nitrous acid was destroyed with sulfamic acid. The clear diazo solution was added during one hour at 0° C to a solution of 19.8 g. N-2-(o-hydroxybenzylidene)pyridine (obtained in Example II (A)) in 500 ml. water, 4 g. sodium hydroxide beads and 37 g. soda ash. After coupling was complete, the mixture was filtered and the cake was washed neutral with water. The dispersed product dyed nickel-contained polypropylene in bright golden orange shades having very good general fastness properties especially to crocking and dry cleaning solvents.

EXAMPLE XI

A. Preparation of the Dye

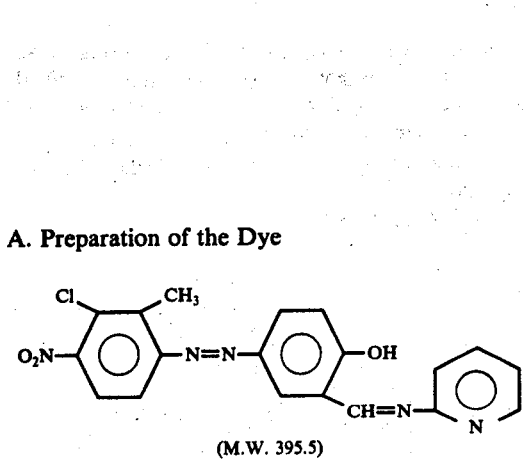

(M.W. 395.5)

A mixture of 18.4 g. 4-nitro-3-chloro-o-toluidine and 100 g. 66° Be sulfuric acid was stirred to complete solution. The clear solution was then drowned into 500 g. ice, 500 ml. water, 3 g. Tween 20 and 25 g. 32% hydrochloric. The mixture was diazotized with a solution of 7 g. sodium nitrite in 50 ml. water. The diazo mixture was stirred at 0°–5° C for two hours. Excess nitrous acid was destroyed with sulfamic acid and the diazo mass was clarified. The clear diazo solution was added during two hours at 0° C to a solution of 19.8 g. N-2-(o-hydroxybenzylidene)pyridine (obtained in Example II (A)) in 500 ml. water, 4 g. sodium hydroxide beads and 130 g. soda ash. After coupling was complete, the mixture was filtered and the cake was washed neutral with water. The dispersed product when printed on nickel-containing polypropylene, produced strong yellowish brown shades having good light fastness and excellent resistance to crocking.

EXAMPLE XII

A. Preparation of the Dye (M.W. 416)

Nitrosyl sulfuric acid was prepared by adding, in small portions below 15° C, 7.2 g. sodium nitrite to 100 g. 66° Be sulfuric acid. The mixture was stirred at 65° C to complete solution. It was then cooled to 0° C and there was added in small portions 20.7 g. 2,6-dichloro-4-nitroaniline. The mass was stirred two hours at 0°–5° C. The diazo mass was then added carefully during two hours at 0° C to a solution of 19.8 g. N-2-(o-hydroxybenzylidene) pyridine (obtained in Example II (A)) in 500 ml. water, 4 g. sodium hydroxide flakes and 150 g. soda ash. After coupling was complete, the mixture was filtered and the cake was washed neutral with water. The dispersed product dyed nickel-containing polypropylene in attractive reddish brown shades having very good general fastness properties.

EXAMPLE XIII

A. Preparation of the Dye (M.W. 412)

A mixture of 20.3 g. 6-amino-2-naphthol-3-carboxylic acid in 40 g. 32% hydrochloric acid and 500 ml. water was heated and stirred for one half hour. The mixture was then iced to 0° C and was diazotized with a solution of 7.1 g. sodium nitrite in 50 ml. water. After stirring one hour at 0° C, excess nitrous acid was destroyed with sulfamic acid. The diazo solution was then coupled with N-2-(o-hydroxybenzylidene)pyridine as described in Example XII. The above product was obtained in 83% yield. The dispersed product dyed nickel-containing polypropylene in strong brown shades having excellent light fastness and near perfect resistance to crocking and dry cleaning solvents.

EXAMPLE XIV

A. Preparation of the Dye (M.W. 402.5)

A mixture of 19.4 g. 1-amino-3-chloro-2-naphthol in 40 g. 32% hydrochloric acid and 300 ml. water was stirred and iced to 5° C. Then there was added in sequence 0.3 g. copper sulfate and a solution of 7.2 g. sodium nitrite dissolved in 50 ml. water. After stirring for one hour, excess nitrous acid was destroyed with sulfamic acid. The diazo mixture was then coupled with N-2-(o-hydroxybenzylidene)pyridine as described in Example X. The above product was obtained in 68% yield. The dispersed product, when printed on nickel-containing polypropylene produced brown shades of very good general fastness properties, particularly to crocking.

EXAMPLE XV

A. Condensation product of 2-Aminopyridine with 3-Hydroxy-2-naphthaldehyde

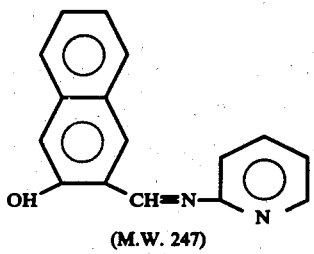

(M.W. 247)

The procedure of Example II (A) was repeated with the exception that an equivalent quantity of 3-hydroxy-2-naphthaldehyde was used instead of the salicylaldehyde. The above product was obtained in 69% of the theoretical yield.

B. Preparation of the Dye

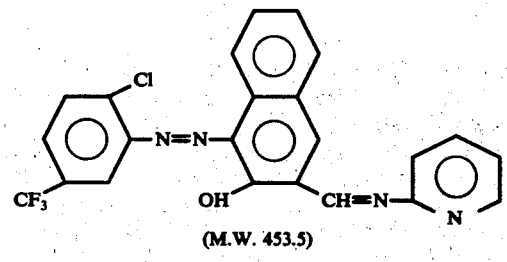

(M.W. 453.5)

A mixture of 19.6 g. 3-amino-4-chlorobenzotrifluoride in 60 g. 32% hydrochloric acid, 2 g. Tween 20 and 100 ml. water was diazotized at −5° to 0° C with a solution of 7.2 g. sodium nitrite in 50 ml. water. After stirring one hour below 0° C, excess nitrous acid was destroyed with sulfamic acid and the diazo solution was clarified. The clear diazo solution was added during one hour at 0° C to a solution of 24.7 g. of the product obtained in A., in 500 ml. water, 4 g. sodium hydroxide beads and 50 g. soda ash. After coupling was complete, the mixture was filtered and the cake was washed neutral with water. The dispersed product dyed nickel-containing polypropylene in attractive reddish brown shades of good general fastness properties.

EXAMPLE XVI

A. Preparation of the Dye

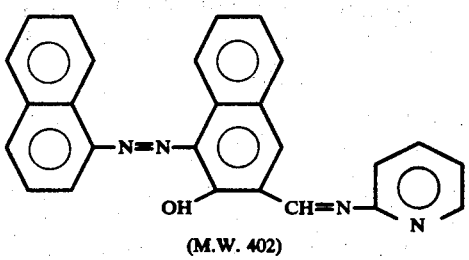

(M.W. 402)

Fourteen and seven-tenths grams of 1-naphthylamine was diazotized according to the procedure described in Example III (A). The clear diazo solution was coupled with the product obtained in Example XV (A) in accordance with the procedure described in Example XV (B). The dispersed product dyed nickel-containing polypropylene in pale brown shades.

EXAMPLE XVII

A. Condensation Product of 2-Amino-4-picoline with 1-Hydroxy-2-naphthaldehyde

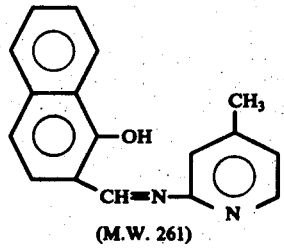

(M.W. 261)

The procedure of Example II (A) was repeated with the exception that equivalent quantities of 1-hydroxy-2-naphthaldehyde and 2-amino-4-picoline were used instead of, respectively, salicylaldehyde and 2-aminopyridine. The above product was obtained in 72% of the theoretical yield.

B. Preparation of the Dye

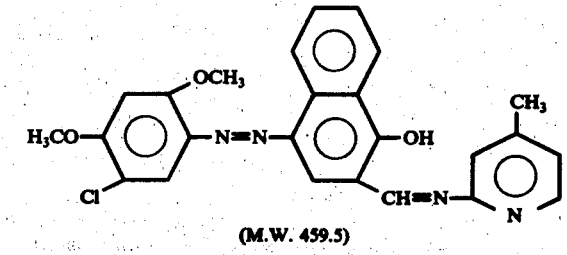

(M.W. 459.5)

A mixture of 18.8 g. 5-chloro-2,4-dimethoxyaniline in 40 g. 32% hydrochloric acid, 2 g. Tween 20 and 200 ml. water was stirred to complete solution. The solution was iced to 0° C and was diazotized with 7.2 g. sodium nitrite dissolved in 50 ml. water. After stirring one hour below 5° C, excess nitrous acid was destroyed with sulfamic acid. The clear diazo solution was added during one hour at 0° C to a solution of 26.1 g. of the product obtained in (A), in 500 ml. water, 4 g. sodium hydroxide flakes and 30 g. soda ash. After coupling was complete, the mixture was filtered and the cake was washed neutral with water. The dispersed product dyed nickel-containing polypropylene in strong dark reddish brown shades of very good light fastness and excellent resistance to crocking and dry cleaning solvents.

EXAMPLE XVIII

A. Preparation of the Dye

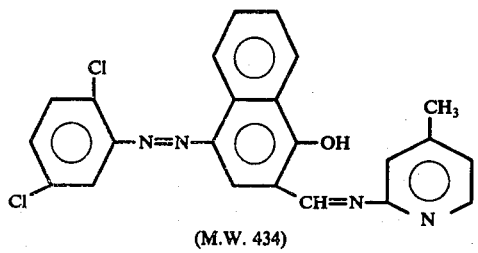

(M.W. 434)

Sixteen and two-tenths grams of 2,6-dichloroaniline was added to a mixture of 40 g. 32% hydrochloric acid, 40 ml. water and 1 g. Tween 20. The mixture was heated at 80° C for 10 minutes. Then it was drowned into ice-water, and was diazotized at 0° C with a solution of 7.2 g. sodium nitrite in 50 ml. water. After stirring one hour below 5° C, excess nitrous acid was destroyed with sulfamic acid and the diazo solution was clarified. The clear diazo solution was coupled with the product obtained in Example XVII(A) in accordance with the procedure described in Example XVII(B). The dispersed product dyed nickel-containing polypropylene in yellowish brown shades of good general fastness properties.

EXAMPLES XIX - XXXX

In accordance with the methods of operation described in the preceding examples, the dyestuffs listed in Table I are prepared by employing the stated starting components. Ni-containing polypropylene is dyed with each compound to produce dyeings having the shades indicated in the table.

The foregoing examples are representative of dyes according to the present invention. The invention is not intended to be limited by the specific embodiments of the working examples but includes the subject matter within the scope and spirit of the appended claims.

What is claimed is:

1. An azomethine dye of the formula:

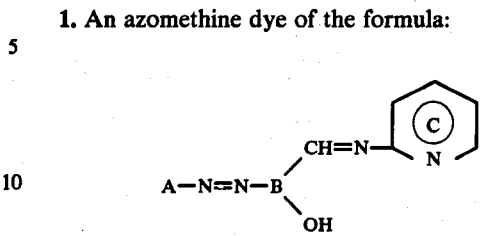

wherein:
A is phenyl, naphthyl, phenyl substituted by up to 3 substituents or naphthyl substituted by up to 2 substituents, said substituents being independently selected from lower alkyl of 1–4 carbons; lower alkoxyl of 1–4 carbons; nitro; cyano; fluorine; chlorine; bromine; trifluoromethyl; hydroxyl; RCOO—, where R is alkyl of 1–4 carbons; carboxyl; ROOC—, where R is alkyl of 1–4 carbons; RCO—, where R is alkyl of 1–4 carbons; benzoyl; RCONH—, where R is alkyl of 1–4 carbons; ArCONH—, where Ar is phenyl; or carbamyl, the nitrogen of which is unsubstituted or singly or doubly substituted by alkyl of 1–4 carbons;

B is salicylaldehyde, o-hydroxy-naphthaldehyde, or salicylaldehyde or o-hydroxy-naphthaldehyde substituted by up to 2 substituents independently selected from lower alkyl of 1–4 carbons; lower alkoxyl of 1–4 carbons; cyano; fluorine; chlorine or bromine;

and

C is 2-aminopyridyl or 2-aminopyridyl substituted by up to 2 substituents independently selected from lower alkyl of 1–4 carbons; lower alkoxyl of 1–4 carbons; nitro; chlorine or bromine.

2. The azomethine dye of claim 1 wherein A is phenyl or phenyl substituted by up to 3 substituents.

3. The azomethine dye of claim 1 wherein A is

TABLE I

| Example | Substituents on Ring A (A) | Substituents on Ring B (B) | Substituents on Ring C (C) | Shade |
|---|---|---|---|---|
| XIX | 4-CH₃C=O | 3-CH₃(CH₂)₂ | 4-Cl | Golden Orange |
| XX | 2-COOH;4-NO₂ | 4-CH₃O | 3-CH₃CH₂ | Orange |
| XXI | 3-CH₃CH₂CONH | 3-Cl | 6-Br | Golden Yellow |
| XXII | 2-CH₃OOC | 3-CH₃CH₂ | 3-Br;5-NO₂ | Yellowish Brown |
| XXIII | 2,6-diCl;4-NO₂ | 6-CH₃O | 5-Cl | " |
| XXIV | 3-OHCH₂CH₂ | 3-CH₃(CH₂)₃O | 4,6-diCl | " |
| XXV | 4-C₆H₅C=O | 3,4-diCH₃O | 5-CH₃CH₂O | Orange |
| XXVI | 2-CN;4-NO₂ | 3-CN | 6-CH₃ | Yellowish Brown |
| XXVII | 4-C₆H₅CONH | 4-CH₃O | 3-CH₃ | Orange |
| XXVIII | 4-CNCH₂CH₂O | 4-CH₃O | 5-CH₃ | Yellowish Orange |
| XXIX | 2-OH;4-NO₂ | 4,6-diCH₃CH₂O | 5-Cl | Reddish Brown |
| XXX | 2-CH₃CH₂O;4-NO₂ | 6-CH₃ | 3,5-diBr | Reddish Orange |
| XXXI | 2-OH;5-NO₂ | 3-CH₃CH₂O | 4-isoBu | Brown |
| XXXII | 4-OHCH₂CH₂O | 3-F | 6-CH₃CH₂O | Orange |
| XXXIII | 4-(OHCH₂CH₂)₂N | 6-CH₃O | 5-Cl | |
| XXXIV | 3-(CH₃CH₂)₂NC=O | 6-CH₃O | 4,6-diCl | Golden Yellow |
| XXXV | 2-CH₃CH₂OOC;4-NO₂ | 4-CH₃O | 6-CH₃O | Brown |
| XXXVI | 2,3-Benz | 4-CH₃O | 3-CH₃CH₂;6-CH₃ | " |
| XXXVII | 2,3-Benz;6-OH | 3-CH₃(CH₂)₃ | 6-Br | " |
| XXXVIII | 2,3-Benz;5Cl;6-OH | 3-CH₃CH₂ | 3-CH₃ | " |
| XXXIX | 2-CH₃CH₂O;5-CH₃CONH | 3-Cl | 3-CH₃ | Orange |
| XXXX | 4-CH₃(CH₂)₃ | 3-Br | 5-CH₃ | Yellowish Orange |

4. The azomethine dye of claim 1 wherein A is

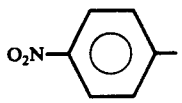

5. The azomethine dye of claim 1 wherein A is

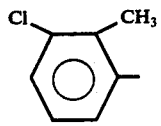

6. An azomethine dye of the formula:

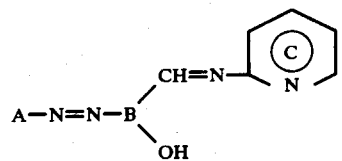

wherein:
A is phenyl or phenyl substituted by up to 3 substituents independently selected from lower alkyl of 1–4 carbons; lower alkoxyl of 1–4 carbons; trifluoromethyl; fluorine; bromine or chlorine;

B is salicylaldehyde or salicylaldehyde substituted by up to 2 substituents independently selected from lower alkyl of 1–4 carbons; lower alkoxyl of 1–4 carbons; fluorine; chlorine or bromine;

and

C is 2-aminopyridyl or 2-aminopyridyl substituted by up to 2 substituents independently selected from lower alkyl of 1–4 carbons; lower alkoxyl of 1–4 carbons; fluorine; chlorine or bromine.

7. An azomethine dye of the formula:

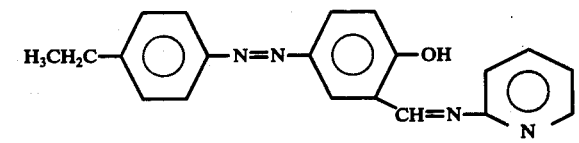

* * * * *